(12) United States Patent
Hurevich et al.

(10) Patent No.: US 6,407,870 B1
(45) Date of Patent: Jun. 18, 2002

(54) OPTICAL BEAM SHAPER AND METHOD FOR SPATIAL REDISTRIBUTION OF INHOMOGENEOUS BEAM

(76) Inventors: Ihar Hurevich, Im Lorohonfold 8, 77135, Saarbrucken (DE); Dimitri Velikov, 1371 Greenbrier Rd., San Carlos, CA (US) 94070; James Ritter, 44856 Vista Del Sol, Fremont, CA (US) 94539; Andrey Shalapenok, 2017 California St., #3B, Mountain View, CA (US) 94040; Alexander Shkolnik, 485 Dartmouth Ave., San Carlos, CA (US) 94070

( * ) Notice: Subject to any disclaimer, the term of this patent is extended or adjusted under 35 U.S.C. 154(b) by 0 days.

(21) Appl. No.: 09/429,775

(22) Filed: Oct. 28, 1999

(51) Int. Cl.$^7$ .......................... G02B 13/08; G02B 3/00; G02B 27/14
(52) U.S. Cl. ........................ 359/668; 359/642; 359/629; 359/636
(58) Field of Search .................................. 359/668, 642, 359/19, 629, 570, 618, 619, 631, 636

(56) References Cited

U.S. PATENT DOCUMENTS

| | | |
|---|---|---|
| 3,476,463 A | * 11/1969 | Kreuzer ....................... 359/717 |
| 4,609,258 A | 9/1986 | Adachi et al. ............... 359/488 |
| 5,056,881 A | 10/1991 | Bowen et al. ................. 359/19 |
| 5,268,922 A | 12/1993 | Fouere et al. ................. 372/98 |
| 5,369,659 A | 11/1994 | Furumoto et al. ............. 372/50 |
| 5,541,774 A | 7/1996 | Blandenrecler ............. 359/653 |
| 5,636,059 A | 6/1997 | Snyder ....................... 359/668 |
| 5,808,323 A | 9/1998 | Spaeth et al. ................. 257/88 |
| 5,825,551 A | 10/1998 | Clarkson .................... 359/629 |
| 6,128,134 A | * 10/2000 | Feldman ..................... 359/565 |

* cited by examiner

Primary Examiner—Georgia Epps
Assistant Examiner—Michael A. Lucas (57) ABSTRACT

An optical system comprising a first array of individual beam shaping elements and a second array of beam shaping elements placed between a light source, e.g., a linear array of individual laser diodes and a reshaped beam receiver, e.g., an optical fiber cable. The inhomogeneous beams emitted from the laser diodes are passed in sequence through the first and second stages so that the first stage reshaped the cross section of the beam, e.g., in the fast-axis direction and the second stage reshapes the cross section of the beam, e.g., in the slow-axis direction. As a result, the output beams of the system may have a cross section reshaped to any desired configuration, e.g., suitable for inputting into the optical fiber cable and having divergences individually adjusted in mutually perpendicular directions.

17 Claims, 7 Drawing Sheets

OPTICAL BEAM SHAPER AND METHOD FOR SPATIAL REDISTRIBUTION OF INHOMOGENEOUS BEAM

FIELD OF INVENTION

The present invention relates to the field of optics, in particular to an apparatus and method for controlling an optical beam. More specifically, the invention concerns an optical beam shaper and a method for spatial redistribution of inhomogeneous beam. The invention may find application in laser optics, e.g., in shaping and collimation of beams emitted by laser diodes.

BACKGROUND OF THE INVENTION

Figure 1A:
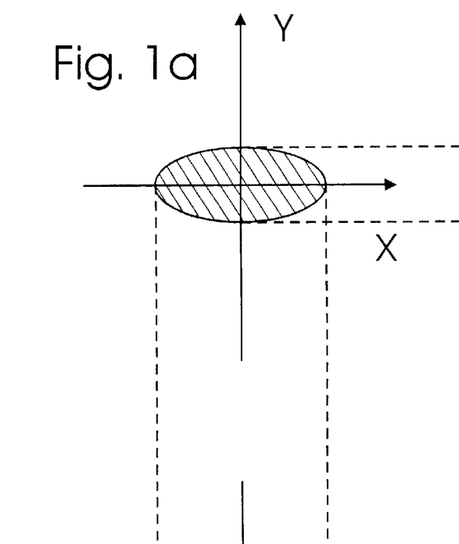

A beam emitted practically by any light source has in its cross section two mutually orthogonal directions where the difference in angular divergences of the beam has a maximum value. Conventionally, the direction with the maximal divergence is known as a fast axis, and the one with the minimal divergence is known as a slow axis. For better understanding of this definition, we can refer to FIG. 1, which is a schematic view of a cross section of a beam B with projections B1 and B2 of this beam in two mutually perpendicular planes X-Z and Y-Z. In other words, FIG. 1 shows decomposition of beam image B into two mutually perpendicular projections. It can be seen that the divergence angle $\phi$ of the beam projection B1 in plane Y-Z is greater than the divergence angle $\psi$ of the beam projection B2 in plane X-Z. According to the definition given above, axis Y is a fast axis and axis X is a slow axis.

The above phenomenon creates problems in some optical devices where homogeneity of a beam in mutually perpendicular directions of its cross section is a critical factor. One such device is a laser diode which lately finds a very wide application in the fields of communication, materials processing, medical instrumentation, etc.

A laser diode is a light-emitting diode designed to use stimulated emission to form a coherent-light output. This laser has a very high efficiency (Q), is compact in design, but has a very high angular divergence in both fast and slow axes. Therefore, in such devices as laser diodes, and especially in linear arrays of laser diodes, the aforementioned orthogonal difference in divergences is especially noticeable and undesirable.

Heretofore many attempts have been made to solve the above problem in laser diodes and laser diode arrays. For example, U.S. Pat. No. 5,268,922 issued in 1993 to J.-C. Fouere and C. Metreaud discloses a simple optical collimating device for a single laser diode in the form of a single aspheric lens assembled integrally with a laser diode. A disadvantage of such a device is that in order to compensate for divergence difference in orthogonal axes of the beam cross section, the aforementioned aspheric lens should have a complicated custom design. Furthermore, the device of U.S. Pat. No. 5,268,922 is not applicable to laser diode arrays because of even higher spatial angular anisotropy and partial overlapping of beams emitted by adjacent diodes in the same plane.

U.S. Pat. No. 5,636,059 issued in 1997 to J. Snyder discloses an assembly of two aspheric, e.g., cylindrical, lenses with mutually perpendicular generatrices of refractive surfaces. Each lens functions for a separate axis, i.e., one lens reshapes the beam in the fast axis, while the other reshapes the beam in the slow axis. A similar system may consist of two reflective surfaces, e.g., mirrors, similarly located with respect to each other. Although such a system differentiates beam reshaping functions along different axes, it has a macroscopic, i.e., extended size and therefore present a problem for implementation for a matrix-type arrangements of light sources, particularly for those with small steps.

U.S. Pat. No. 5,056,881 issued in 1991 to Terry Bowen, et al. describes an assembly of a laser diode and at least one optical holographic element located at the output of the laser diode. This system circularizes the beam, collimates it, and removes chromatic aberrations. In order to ensure sufficient power compatibility, the holographic element of such a system should be manufactured from a very durable and energetically efficient material such as quartz, which makes the system as a whole relatively expensive. If, on the other hand, the system employs inexpensive, e.g., plastic replicas for the holographic element, it would have practical applications limited only to low-power sources. Furthermore, similar to the system of U.S. Pat. No. 5,636,059, the system with holographic elements is inapplicable to matrix-type sources.

U.S. Pat. No. 4,609,258 issued in 1986 to Iwao Adachi, et al. discloses a collimating system for laser diodes which utilizes a prismatic-type collimator. A disadvantage of this system is that it generates chromatic aberrations inherent in any prismatic systems. Despite the fact that the system itself consists of many components, compensation of the aforementioned aberrations requires the use of additional optical components. As a result, the system has increased overall dimensions.

U.S. Pat. No. 5,541,774 issued in 1996 to R. Blankenbecler describes so-called gradient optical elements. These optical elements can replace various cylindrical, conical, and other aspheric elements use for collimating and beam reshaping. Such optical systems are compact, compatible with matrix-type light sources, but complicated in structure and expensive to manufacture. However, the range of commercially available materials is limited, and therefore gradient optical elements can be manufactured with limitations dictated by wavelengths and output power of the light sources compatible with such optical systems. Another disadvantage of gradient optical elements in light of their application to beam shaping is that they have a limited range of the refractive index variation, which sometimes is insufficient for precise reshaping of the light beam.

U.S. Pat. No. 5,825,551 issued in 1998 to William A. Clarkson discloses a beam shaper utilizing a principle of multiple re-reflection in the system of two parallel reflective surfaces (including the case of total internal reflection). A main disadvantage of such a system is interference of reflected beams which causes spatial modulation of radiation resulting in its inhomogeneity.

Another similar system is described in U.S. Pat. No. 5,808,323 issued in 1998 to Werner Spaeth, et al. This system consists of a cylindrical lens common for a line of photo diodes and two mirrors. The use of a cylindrical lens introduces into the system all disadvantages described above with regard to the systems utilizing aspheric elements. Furthermore, the use of a single cylindrical lens for the entire strip of the diodes does not prevent the adjacent beams from interference and does not allow individual adjustment of beams emitted by individual light sources.

The above disadvantages are partially solved in a fault tolerant optical system described in U.S. Pat. No. 5,369,659 issued in 1994 to Horace Furumoto, et al. The system consists of the following elements arranged in sequence: a laser diode array, two lenslet arrays (collimating and correcting), and directing and focusing optics assembly. However, this system comprises a macroscopic workbench which collimates and corrects individual beams as a whole without addressing the aforementioned fast and slow axes individually, i.e., without separate adjustment of beam divergence in the aforementioned directions. Thus, such a system will not compensate for faults resulting from non-uniform divergence of the beam in the directions of slow and fast axes. This system rather differentiates two functions of the beam shaper, i.e., one lens array is used for correcting the optical faults where the second lens array performs fillfactor enhancement. Another disadvantage of the sytem of U.S. Pat. No. 5,369,659 is that it consists of a plurality of individual lenses produced, e.g., by laser milling. In other words, each array has a composite structure and consists of a plurality of individually manufactured or processed lenses. Moreover, as is stated in the aforementioned U.S. patent, in the manufacturing process with the use of laser milling each individual lens is associated with an individual laser. Thus, the manufacturing process is complicated, expensive, time-consuming, and may involve custom design. The device of U.S. Pat. No. 5,369,659 cannot be produced in a single manufacturing step such as molding or etching.

OBJECTS OF THE INVENTION

It is an object of the present invention to provide an optical beam shaper for spatial redistribution of inhomogeneous beam in mutually perpendicular directions of the beam cross section. It is another object is to provide an optical beam shaper of the aforementioned type which has a simple universal design, is easy to manufacture, is applicable to microscopic light source arrays, including matrix-type arrangements of laser diodes with small steps, is free from limitations inherent in beam shapers with holographic elements, does not generate chromatic aberrations, may constitute a single part, e.g., molded from an optical material, has small overall dimensions, is free of limitations dictated by wavelengths and output power of the light sources, allows a wide range of the refractive index variations, is free from interference of individual beams, and facilitates individual adjustment of beams emitted by individual light sources.

SUMMARY OF THE INVENTION

The invention relates to an optical beam shaper and a method for spatial redistribution of inhomogeneous beam based on a principle of separate reorientation of beam components along a slow axis and a fast axis. The device is applicable to coherent light sources, e.g., in the form of arrays, including matrix-type arrangements of laser diodes with small steps. One embodiment relates to a beam shaper in which arrays of shaping elements for the slow axis and the fast axis are made in the form of two separate units. In the beam shaper of the second embodiment, shaping element arrays for the slow axis and the fast axis are formed on opposite sides of an integral unit. In the third embodiment, an array of shaping elements for one axis is formed on one side of an integral unit, whereas the beam-shaping element for the second axis is made on the opposite side of the integral block in the form of a single concave lens. The resulting pattern of the beams obtained at the output of the device can be reshaped into any desired configuration. For example, the light emitted by a linear array of laser diodes can be reshaped into a compact pattern suitable for entering an input of an optical fiber cable. The device of the invention can be used as a collimator or a partial collimator, e.g., for laser diode strips.

BRIEF DESCRIPTION OF THE DRAWINGS

FIG. 1$a$ is a general cross section of an optical beam beam emitted by a single light source.

FIG. 1$b$ is a projection of the beam of FIG. 1$a$ in a Y-Z plane perpendicular to the main optical axis.

FIG. 1$c$ is a projection of the beam of FIG. 1$a$ in a plane X-Z perpendicular to the main optical axis and to the Y-Z plane.

FIG. 2$a$ is a schematic three-dimensional view of a device of the invention in which some of individual lenses of both arrays have orientations different from other lenses of the same array.

FIGS. 3$a$ and 3$b$ are examples of cross sections of a plurality of beams reshaped with the use of the device of FIG. 2.

DETAILED DESCRIPTION OF THE INVENTION

Figure 1B:
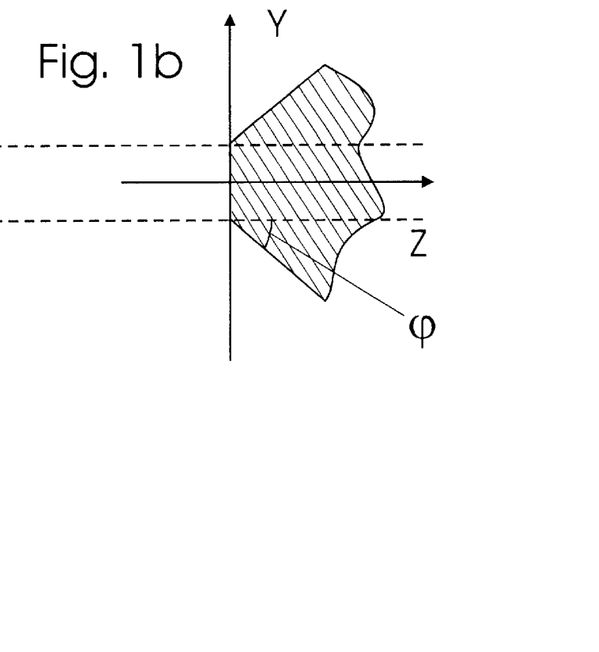
Figure 1C:
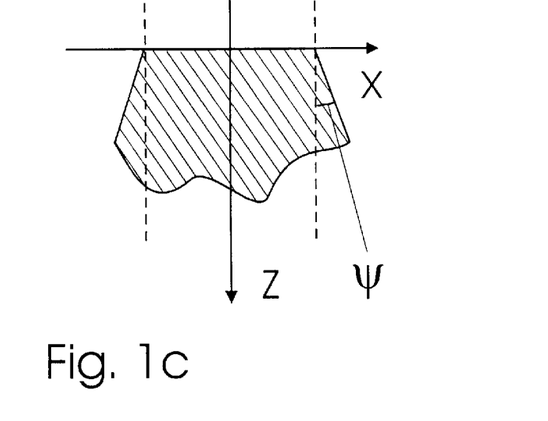
Figure 2:
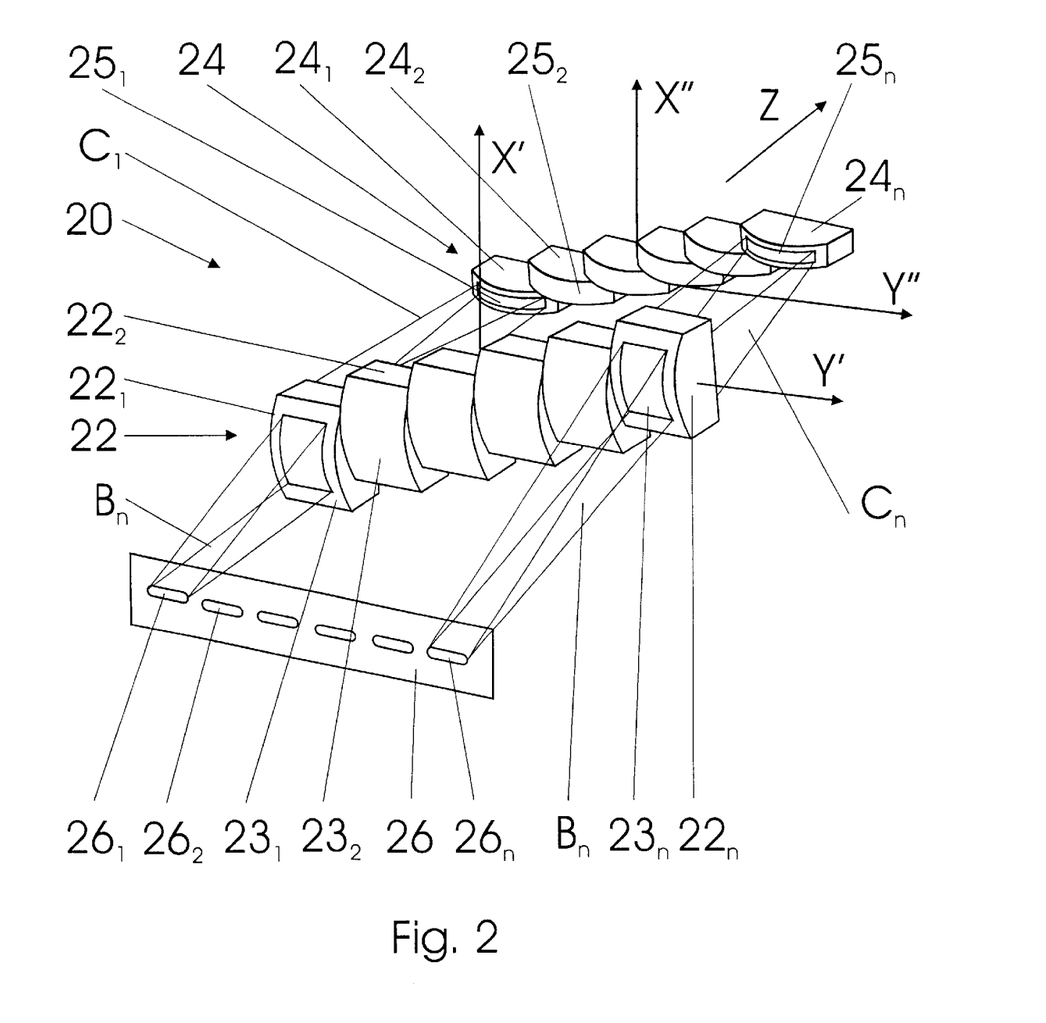
FIG. 2 is a schematic three-dimensional view of a beam shaper in which arrays of shaping elements for the slow axis and the fast axis are made in the form of two separate units.

A beam shaper made in accordance with one embodiment of the invention is shown in FIG. 2, which is a schematic three-dimensional view. A beam shaper 20 shown in this drawing consists of two independent arrays 22 and 24 of shaping elements. Array 22 consists of a plurality of beam shaping elements $22_1, 22_2 \ldots 22_n$, whereas array 24 consists of a plurality of beam shaping elements $24_1, 24_2 \ldots 24_n$. In the illustrated embodiment, each beam shaping element of arrays 22 and 24 is made in the form of an aspheric, e.g., cylindrical lens having a convex surface facing a light source 26, such as, e.g., a laser diode strip 26 formed by a plurality of a linearly arranged laser diodes $26_1, 26_2, \ldots 26_n \ldots$ . The lenses can be made of a transparent optical material such as fused silica, quartz, plastic, glass, etc. They can be produced by etching, molding, or any other conventional method known in the art. The lenses may be as small as required, e.g., they may have submillimetric dimensions. However, each lens $22_1, 22_2 \ldots 22_n$ of lens array 22 should have height "a" and width "b" (FIG. 2) sufficient to cover angular aperture (which is defined by aforementioned angles $\phi$ and $\psi$ shown in FIGS. 1$b$ and 1$c$) of corresponding light sources $26_1, 26_2, \ldots 26_n$. The same is true with regard to height "$a^1$" and width "$b^1$" of respective lenses $24_1, 24_2 \ldots 24_n$. In the embodiment illustrated in FIG. 2, the refractive surfaces $23_1, 23_2 \ldots 23_n$ of the lenses $22_1, 22_2 \ldots 22_n$ and refractive surfaces $25_1, 25_2 \ldots 25_n \ 24_1, 24_2 \ldots 24_n$ are cylindrical.

Each array of beam shaping elements is intended for reshaping beams $B_1, B_2, \ldots B_n$ emitted from light sources 26. In the case shown in FIG. 2 the number of laser diodes $26_1, 26_2, \ldots 26_n$ corresponds to he number of beam shaping elements $22_1, 22_2 \ldots 22_n$, and $24_1, 24_2 \ldots 24_n$, respectively. Each array of beam shaping elements is intended for reshaping beams in the direction of one of two mutually orthogonal axes of the beam cross section where the difference in angular divergences of the beam has a maximum value. For example, array 22 reshapes beams in the direction of a fast axis Y (FIG. 1b), and array 24 reshapes beams in the direction of a slow axis X (FIG. 1c). In other words, generatrices of cylindrical surfaces of lenses $22_1, 22_2 \ldots 22_n$ are perpendicular to generatrices of cylindrical surfaces of lenses $24_1, 24_2 \ldots 24_n$.

According to the embodiment of FIG. 2, two independent arrays 22 and 24 can be manufactured individually. Respective arrays 22 and 24, in turn, can be assembled from individual elements $22_1, 22_2 \ldots 22_n$, and $24_1, 24_2 \ldots 24_n$, or the aforementioned elements can be produced as an integral unit, e.g., by etching, molding, etc.

Individual beam shaping elements $22_1, 22_2 \ldots 22_n$, and $24_1, 24_2 \ldots 24_n$, are arranged in such a way as to prevent overlapping of beams ($B_1, B_2, \ldots B_n$, as well as beams $C_1, C_2, \ldots C_n$ between individual elements $22_1, 22_2 \ldots 22_n$, and $24_1, 24_2 \ldots 24_n$, respectively) on any part of the optical paths from light sources $26_1, 26_2, \ldots 26_n$ to outlet beam shaping elements $24_1, 24_2 \ldots 24_n$. This is achieved by shifting individual beam shaping elements $22_1, 22_2 \ldots 22_n$, and $24_1, 24_2 \ldots 24_n$, with respect to each other and/or rotating these elements with respect to each other about selected fast and slow axes. In FIG. 2, axes X' and X" are slow axes and axes Y' and Y" are fast axes.

Let us assume that we have to deliver 100% of light emitted from individual light sources $26_1, 26_2, \ldots 26_n$ of laser diode strip 26 into a reshaped beam receiver, e.g., an optical fiber 36 shown in FIG. 3. This drawing illustrates an example of a cross section of a plurality of beams reshaped with the use of the device of FIG. 2.

The device of FIG. 2 operates as follows:

Light beams $B_1, B_2, \ldots B_n$ are emitted from individual laser diodes $26_1, 26_2, \ldots 26_n$ of laser diode strip 26 and are sent to respective individual beam shaping elements $22_1, 22_2 \ldots 22_n$, and then to respective individual beam shaping elements $24_1, 24_2 \ldots 24_n$. Since beam shaping elements $22_1, 22_2 \ldots 22_n$, of array 22 are shifted and/or rotated with respect to each other, beams $C_1, C_2, \ldots C_n$ will not overlap after passing through refractive surfaces $23_1, 23_2 \ldots 23_n$. Furthermore, beams $C_1, C_2, \ldots C_n$ pass through individual beam shaping elements $24_1, 24_2 \ldots 24_n$ without going beyond the boundaries of their refractive surfaces $25_1, 25_2, \ldots 25_n$.

As a result of reshaping fulfilled by lens arrays 22 and 24, individual beams $B_1, B_2, \ldots B_n$ will be compacted to a configuration suitable for entering, e.g., optical fiber 36 (FIG. 3).

Figure 3A:
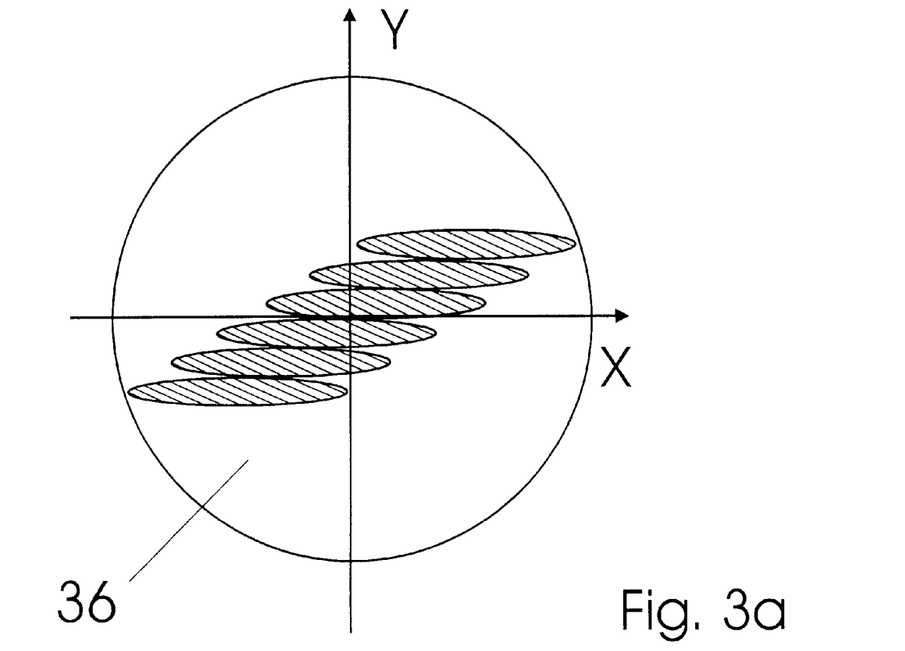
Figure 3B:
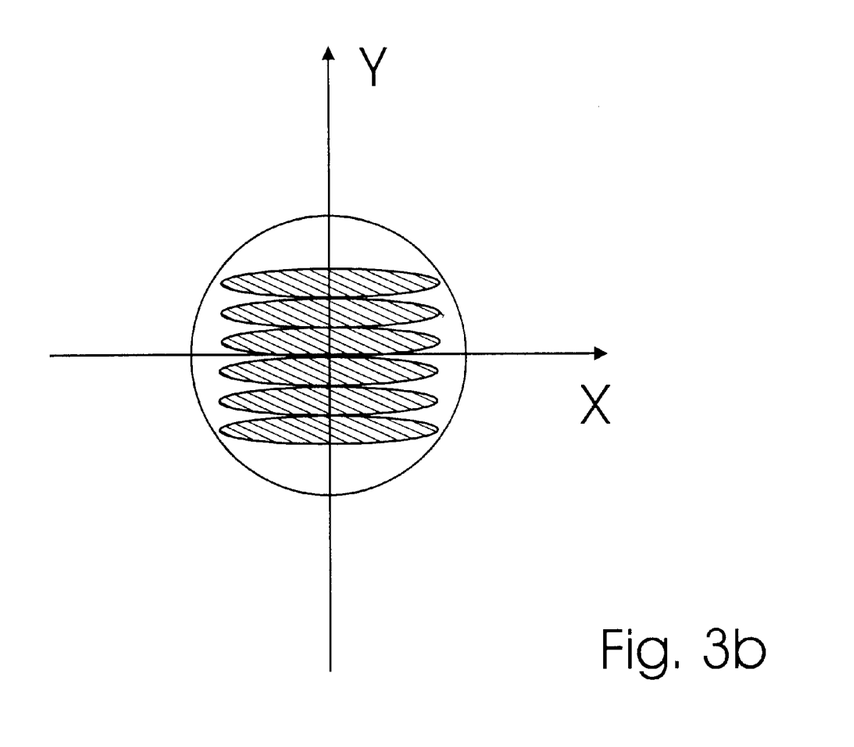

The compact configuration shown in FIG. 3 is given only as an example. It is understood that by selecting the profiles of refractive surface of individual lenses and by shifting and/or rotating individual lenses with respect to each other in a specific manner, it is possible to generate at the output of lens array 24 any required configurations of the beam projections different from the shown in FIG. 3a. An example of such configurations are shown in FIG. 3b.

Figure 2A:
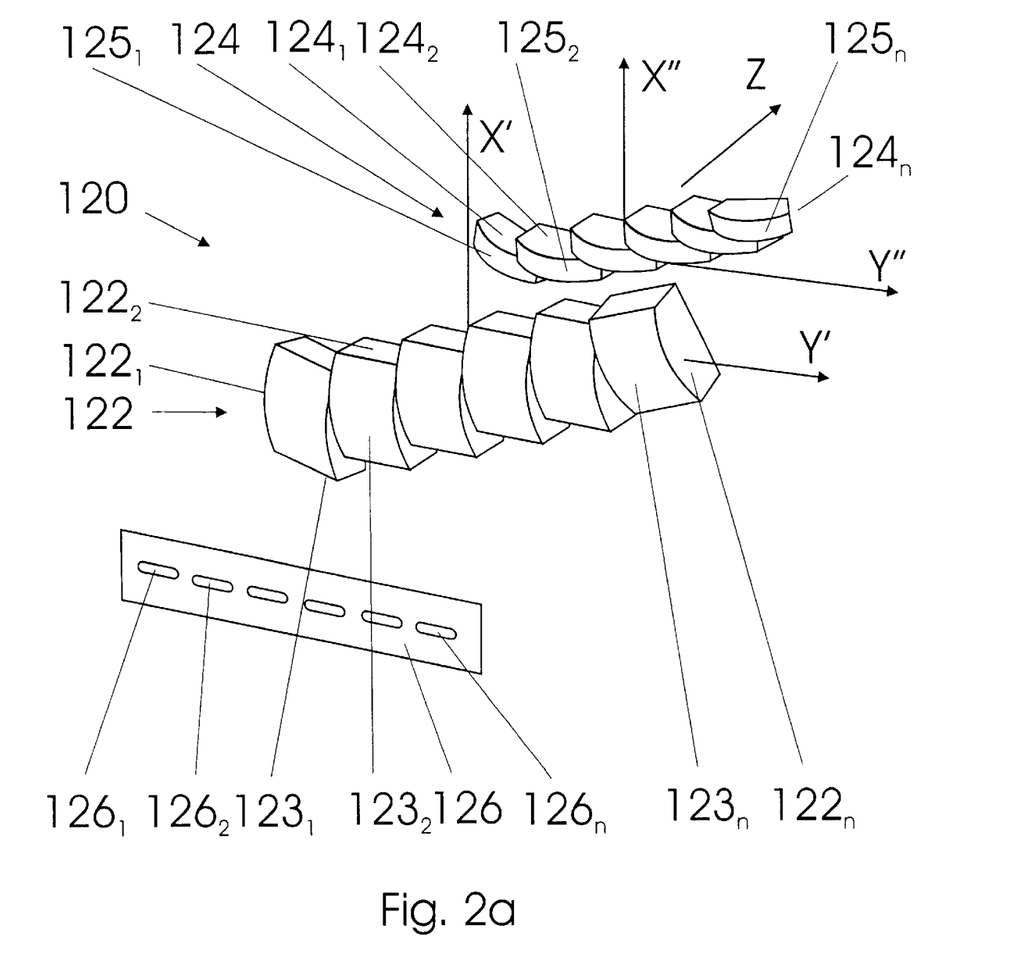

An example of a device of the invention in which at least one of individual lenses of both arrays may have orientations different from other lenses of the same array is shown in FIG. 2a. Since the device of FIG. 2a is similar to the device of FIG. 2, similar parts of the embodiment of FIG. 2a are designated by the same reference numerals with an addition of 100. In other words, a device 120 of FIG. 2a consists of a light source array 126 of individual laser diodes $126_1, 126_2, \ldots 126_n$, a beam shaping element array 122 of beam shaping elements $122_1, 122_2, \ldots 122_n$, and a beam shaping element array 124 of beam shaping elements $124_1, 124_2, \ldots 124_n$. The only difference of the embodiment of FIG. 2a from the embodiment of FIG. 2 is that individual beam shaping elements of any array may be shifted to respective distances and turned by respective angles different from other individual elements. In the embodiment shown in FIG. 2a, beam shaping elements $122_1$, and $122_n$ of array 122 are turned by an angle different from the angular orientation of other elements of this array. The same is true with regard to beam shaping elements $124_1$, and $124_n$.

Device 120 of FIG. 2a operates in the same manner as device 20 of FIG. 2.

Figure 4:
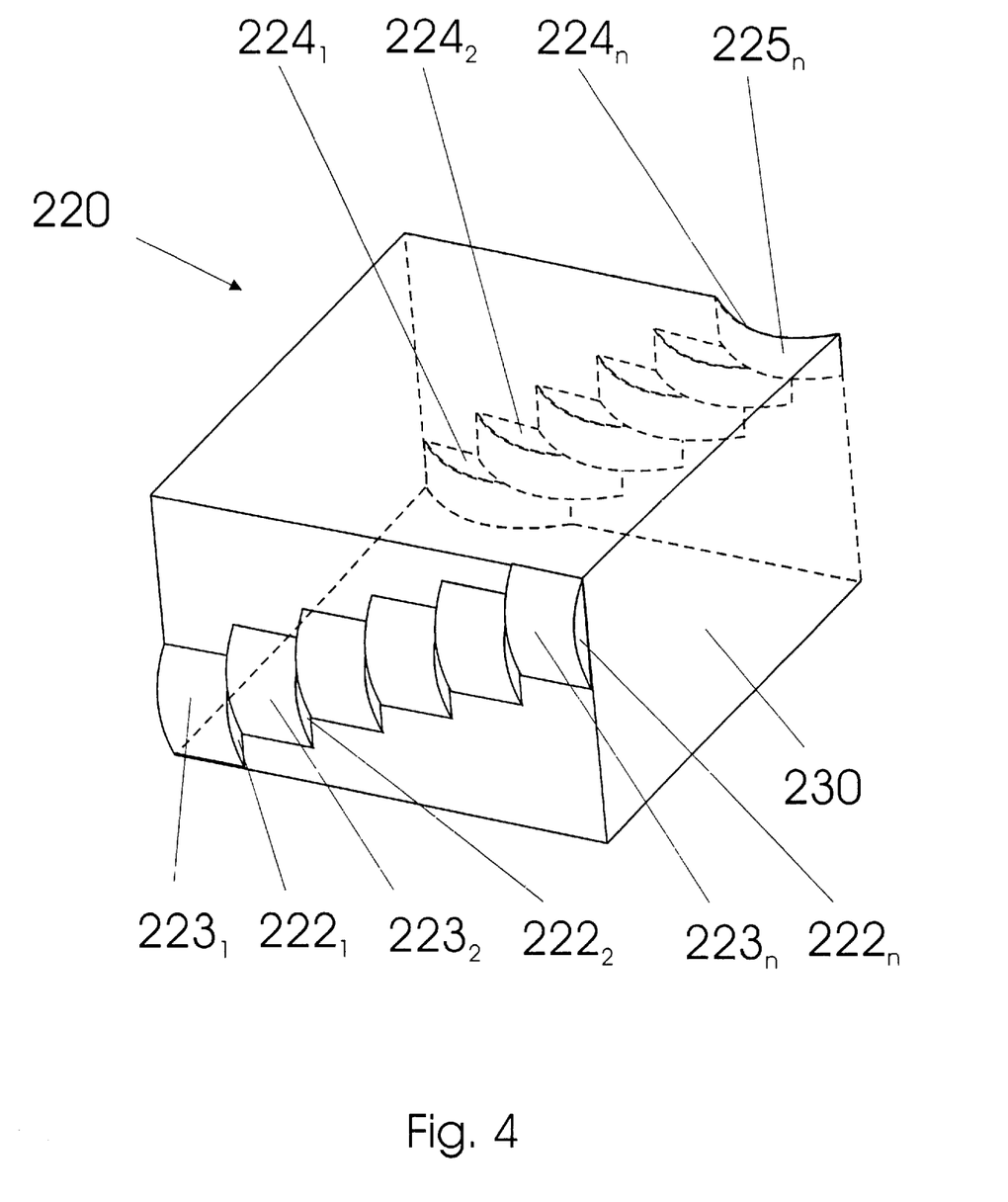
FIG. 4 is a schematic three-dimensional view of a beam shaper in which arrays of shaping elements for the slow axis and the fast axis are formed on opposite sides of an integral unit.

FIG. 4 is a schematic three-dimensional view of a beam shaper 220 of another embodiment of the invention in which an array 222 of beam shaping elements $222_1, 222_2, \ldots 222_n$ for the fast axis and an array 224 of beam shaping elements $224_1, 224_2, \ldots 224_n$, for the slow axis are formed on opposite sides of an integral unit 230. In general, device 220 of this embodiment is similar to device 20 of FIG. 2 and differs from it in that entire beam shaper 220 is made as an integral unit. In the context of the present invention, the term "integral unit" means that beam shaper with all lenses can be made as a monolithic part produced, e.g., by mechanical treatment with subsequent etching of refractive surfaces $223_1, 223_2, \ldots 223_n$ and $225_1, 225_2,$ (not shown) $\ldots 225_n$. Similarly, the term "integral unit" covers beam shapers 220 assembled from separate parts attached to each other, e.g., by gluing, welding, or with the use of mechanical fasteners. Device 220 of FIG. 4 operates in the same manner as device 20 of FIG. 2. It is understood that similar to the device of FIG. 2a, individual refractive surfaces may have selected individual orientation.

Figure 5:
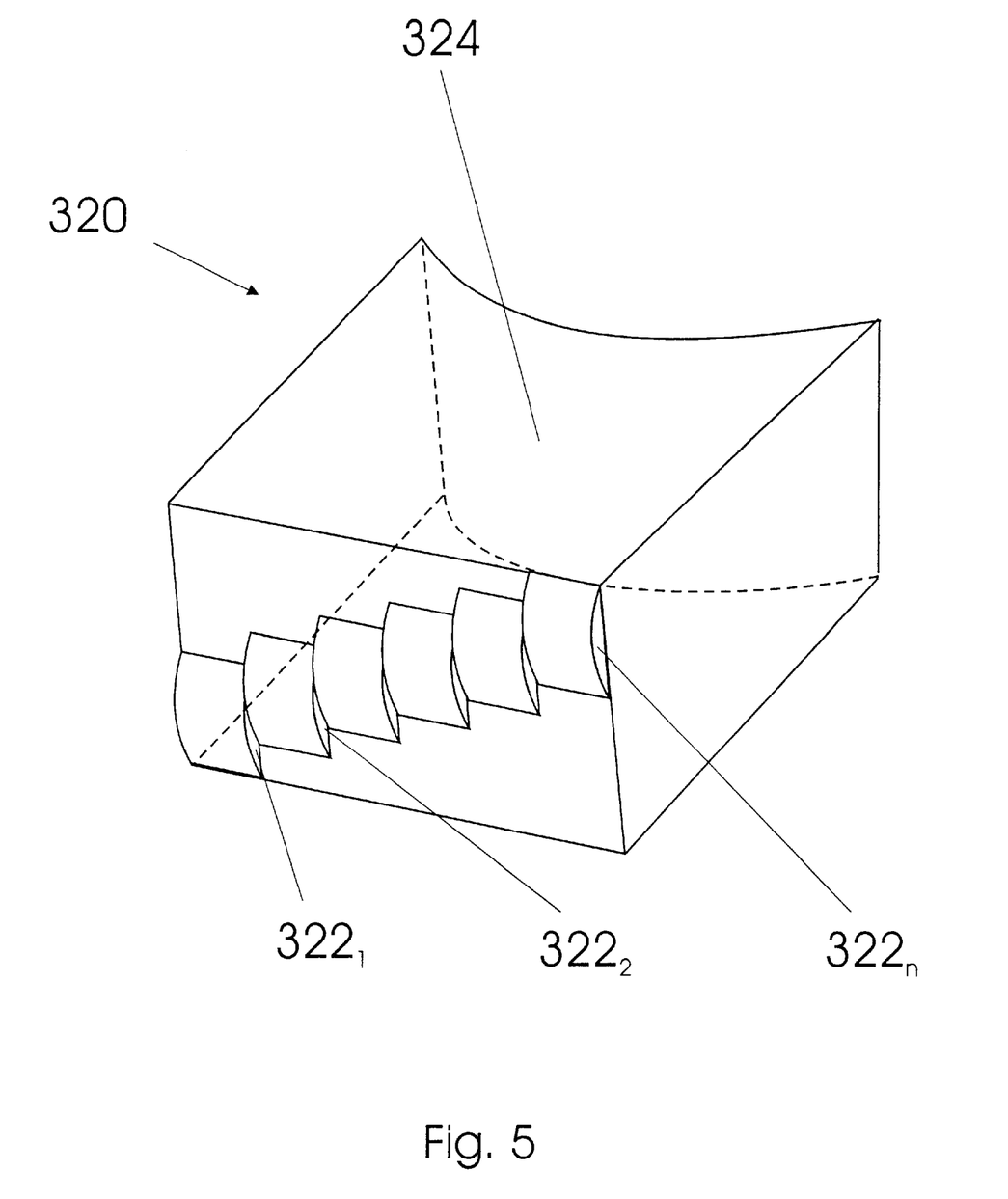
FIG. 5 is a schematic three-dimensional view of a beam shaper in which an array of shaping elements for one axis is formed on one side of an integral unit, whereas the beam-shaping element for the second axis is made on the opposite side of the integral block in the form of a single concave lens.

FIG. 5 is a schematic three-dimensional view of a beam shaper 320 in which an array of shaping elements for one axis is formed on one side of an integral unit, whereas on the opposite side of the integral block the beam-shaping elements for the second axis are made in the form of a single concave lens. More specifically, in the embodiment of FIG. 5 an array 322 of beam shaping elements $322_1, 322_2, \ldots 322_n$ for the fast axis is the same as array 222 of beam shaping elements $222_1, 222_2, \ldots 222_n$ of the embodiment of FIG. 4. However, a continuous concave refractive surface 324 is formed on the output side of beam shaper 320. Although the beams and their paths through beam shaper 320 are not shown in FIG. 5, it is understood that, similar to FIG. 2, the individual beams which pass through individual beam shaping elements $322_1, 322_2, \ldots 322_n$ will not intersect with each other since the aforementioned elements are shifted and/or turned with respect to each other. For the same reason, the beams will leave concave refractive surface 324 from different levels of this surface. The device of FIG. 5 operates and is used in the same manner as beam shapers of the previous embodiments.

Figure 6:
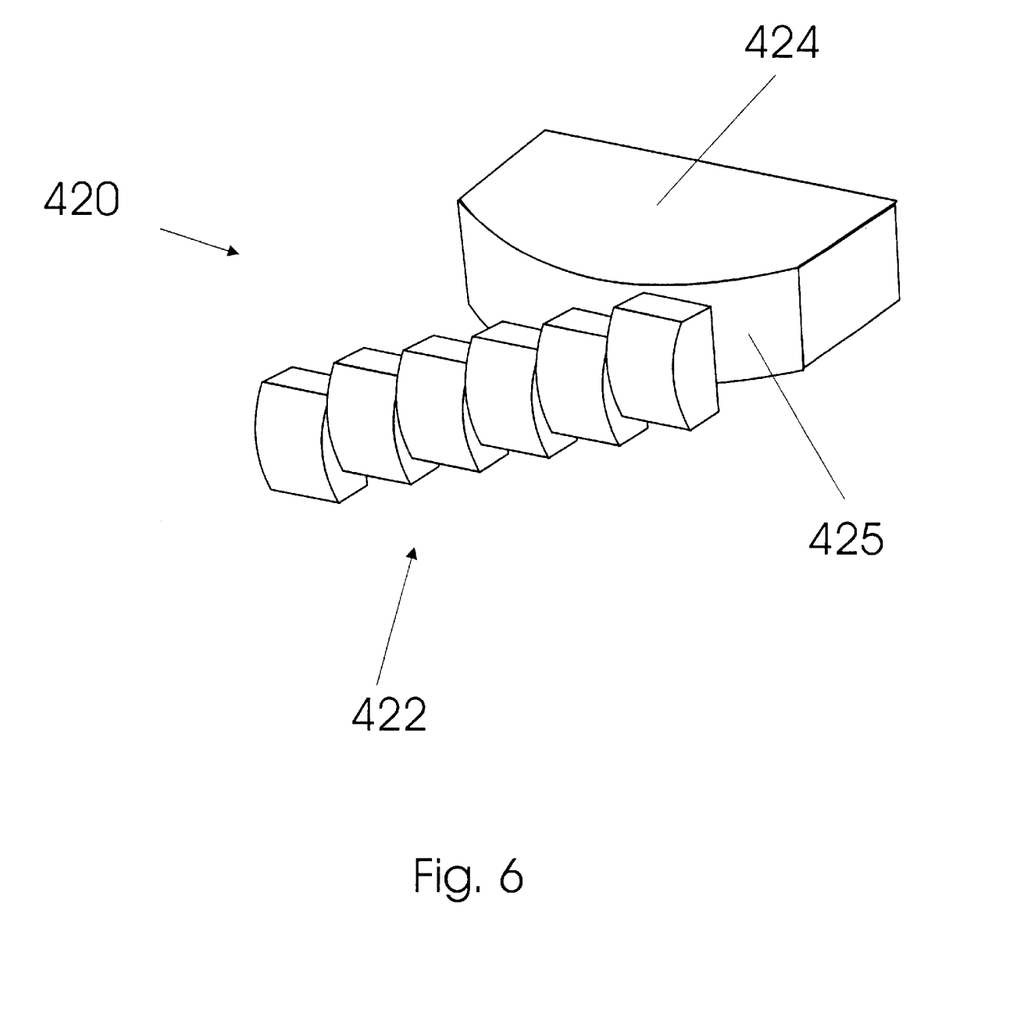
FIG. 6 is a schematic view of a beam shaper similar to the one shown in FIG. 2 but with the second lens array formed as a single lens with the convex surface facing the output side of the first lens array.

FIG. 6 is a schematic view of a beam shaper 420 according to an embodiment which is similar to the one shown in FIG. 2. However, in beam shaper 420 the second lens array is formed as a single lens 424 with a convex refractive surface 425 facing the output side of a first lens array 422. The device of this embodiment operates in the same manner as beam shaper 320 of FIG. 5.

It is understood that if in any of the above embodiments parameters of the beam-shaping stages provide parallel output beams, the system functions as a collimator.

Thus it has been shown that the invention provides an optical beam shaper for spatial redistribution of inhomogeneous beam, which has a simple universal design, is easy to manufacture, is applicable to microscopic light source arrays, including matrix-type arrangements of laser diodes with small steps, is free from limitations inherent in beam shapers with holographic elements, does not generate chromatic aberrations, may constitute a single part, e.g., molded from an optical material, has small overall dimensions, is free of limitations dictated by wavelengths and output power of the light sources, allows a wide range of the refractive index variations, is free from interference of individual beams, and facilitates individual adjustment of beams emitted by individual light sources.

Although the invention has been shown and described with reference to specific embodiments, it is understood that these embodiments should not be construed as limitative and that any modifications and changes are possible, provided they do not depart from the scope of the attached patent claims. For example, the beam shaping system may consist of a plurality of parallel arrays of individual light sources operating in conjunction with a multiple-layered beam shaper. Individual beam shaping elements may be combined into a continuous convex surface on the input side of the beam shaper and made in the form of individually shifted and/or turned elements on the output side of the beam shaper. The light source can be different from a laser diode. It can be, e.g., an excimer light source, or any other coherent light source. The beam shaper can be molded from an optical plastic. The beam shaping elements can be manufactured by mechanical grinding and polishing. A diverging or converging lens system can be placed between the output side of the beam shaper and the reshaped light receiver. Lenses and/or refractive surface in lens arrays and in single lenses may have any shape such as convex, concave, biconcave, biconvex, aspheric, cylindrical, etc. The beam-shaping elements can be arranged in more than two stages. Axes X', X" and Y', Y", respectively, may be not perpendicular to each other. The beams can be reshaped into cross sections different from those shown in FIGS. 3a and 3b.

What is claimed is:

1. An optical beam shaper for spatial redistribution of inhomogeneous beams emitted from a plurality of individual coherent light sources and a reshaped beam receiver for receiving reshaped beams from said individual coherent light sources, said inhomogeneous beams having in its cross section a first direction and a second direction which is perpendicular to said first direction, beam divergences in said first direction and said second direction being different, said optical beam shaper comprising, at least:

a first beam reshaping stage having an input side and an output side, said input side of said first beam reshaping stage facing said plurality of individual coherent light sources;

a second beam reshaping stage having an input side facing said output side of said first beam reshaping stage and an output side facing said reshaped beam receiver;

said first beam reshaping stage reshaping said inhomogeneous beams in said first direction, and said second beam reshaping stage reshaping said inhomogeneous beams in said second direction;

at least one of said stages having a plurality of beam shaping elements with refractive surfaces, at least part of said inhomogeneous beams passing through at least part of said refractive surfaces, said beam shaping elements being placed in positions that prevent intersection of said inhomogeneous beams on said input side of said second stage.

2. The optical beam shaper of claim 1, wherein said beam shaping elements being made in form of a plurality of individual aspheric lenses having convex refractive surfaces on said input side facing said individual coherent light sources.

3. The optical beam shaper of claim 1, wherein said first beam shaping stage has a first array of individual beam shaping elements and said second beam shaping stage having a second array of individual beam shaping elements, at least part of said beam shaping elements of said first stage receiving at least part of individual inhomogeneous beams from said individual coherent light sources, said individual beam shaping elements of said second array receiving individual beams reshaped by said individual beam shaping elements of said first stage.

4. The optical beam shaper of claim 3, wherein said first beam shaping stage and said second beam shaping stage comprise an integral unit made of an optical material.

5. The optical beam shaper of claim 4, wherein said optical material being selected from a group consisting of quarts, glass, fused silica, and plastic.

6. The optical beam shaper of claim 1, wherein said second beam shaping stage comprises a continuous concave surface formed on said output side of said second stage.

7. The optical beam shaper of claim 1, wherein said second beam shaping stage comprises a continuous convex surface formed on said input side of said second stage.

8. An optical system, comprising:

a plurality of individual coherent light sources each of which emits inhomogeneous beams having in its cross section a first direction and a second direction perpendicular to said first direction, beam divergences in said first direction and said second direction being different;

a reshaped beam receiver for receiving reshaped beams from said individual coherent light sources; and a beam shaper between said plurality of said individual coherent light sources and said reshaped beam receiver;

said beam shaper having a first beam reshaping stage having an input side and an output side, said input side of said first beam reshaping stage facing said plurality of individual coherent light sources;

a second beam reshaping stage having an input side facing said output side of said first beam reshaping stage and an output side facing said reshaped beam receiver;

said first beam reshaping stage reshaping said inhomogeneous beams in said first direction, and said second beam reshaping stage reshaping said inhomogeneous beams in said second direction;

at least one of said stages having a plurality of beam shaping elements with refractive surfaces, at least part of said inhomogeneous beams passing through at least part of said refractive surfaces, said beam shaping elements being placed in positions that prevent intersection of said inhomogeneous beams on said input side of said second stage.

9. The optical system of claim 8, wherein said beam shaping elements being made in form of a plurality of individual aspheric lenses having convex refractive surfaces on said input side facing said individual coherent light sources.

10. The optical beam shaper of claim 8, wherein said first beam shaping stage has a first array of individual beam shaping elements and said second beam shaping stage having a second array of individual beam shaping elements, at least part of said beam shaping elements of said first stage receiving at least part of individual inhomogeneous beams from said individual coherent light sources, said individual beam shaping elements of said second array receiving individual beams reshaped by said individual beam shaping elements of said first stage, said reshaped beam receiver receiving individual beams reshaped by said second stage.

11. The optical beam shaper of claim 10, wherein said individual beams have cross sections which fit into the boundaries of the cross section of said reshaped beam receiver.

12. The optical beam shaper of claim 11 wherein said individual light sources are laser diodes, and said reshaped beam receiver is an optical fiber cable.

13. An optical system, comprising:
- a linear array of individual laser diodes each of which emits inhomogeneous beams having in its cross section a first direction and a second direction perpendicular to said first direction, a difference between beam divergences in said first direction and said second direction having a maximum value as compared to other mutually perpendicular pairs of axes in said cross section;
- a reshaped beam receiver for receiving reshaped beams from said individual laser diodes; and
- a beam shaper between said plurality of said individual laser diodes and said reshaped beam receiver;
- said beam shaper having a first beam reshaping stage having an input side and an output side, said input side of said first beam reshaping stage facing said plurality of individual laser diodes;
- a second beam reshaping stage having an input side facing said output side of said first beam reshaping stage and an output side facing said reshaped beam receiver;
- said first beam reshaping stage reshaping said inhomogeneous beams in said first direction, and said second beam reshaping stage reshaping said inhomogeneous beams in said second direction;
- at least one of said stages having a plurality of beam shaping elements with refractive surfaces, said inhomogeneous beams passing through said refractive surfaces, said beam shaping elements being placed in positions that prevent intersection of said inhomogeneous beams on said input side of said second stage.

14. The optical system of claim 13, wherein said beam shaping elements of said first stage and of said second stage is made in form of a plurality of individual aspheric lenses having convex refractive surfaces on the input sides of said first stage and said second stage facing said individual laser diodes.

15. The optical beam shaper of claim 14, wherein said individual beams have cross sections which fit into the boundaries of the cross section of said reshaped beam receiver.

16. The optical beam shaper of claim 15 wherein said reshaped beam receiver is an optical fiber cable.

17. A method for spatial redistribution of inhomogeneous beams emitted from a plurality of linearly arranged coherent light sources and having in their cross sections two mutually perpendicular directions in which the difference in divergences of said inhomogeneous beams has a maximum value, the method comprising the steps of:
- providing a beam shaper having a first beam-shaping stage of a plurality of beam shaping elements for shaping said inhomogeneous beams in one of said directions and a second beam-shaping stage of a plurality of beam shaping elements for shaping said inhomogeneous beams in the other of said directions;
- reshaping said inhomogeneous beams by passing them through said first stage of said plurality of beam shaping elements thus obtaining beams reshaped in said one of said directions;
- reshaping said beams reshaped in said one of said directions by passing them through said second stage of said plurality of beam shaping elements thus obtaining beams reshaped in said other of said directions; and
- directing said beams reshaped in said other of said directions to a shaped beam receiver.

\* \* \* \* \*